R. WHITEHILL, Jr.,

Assignor to THE WHITEHILL MANUFACTURING COMPANY.

MOTOR FOR OPERATING SEWING MACHINES.

No. 9,949. Reissued Nov. 29, 1881.

Witnesses.
John F. C. Brenkert
Bennie J. Noyes.

Inventor.
Robert Whitehill Jr
Assignor to The Whitehill Manufacturing Co.
by Crosby & Gregory
Attys

UNITED STATES PATENT OFFICE.

ROBERT WHITEHILL, JR., OF MILWAUKEE, WISCONSIN, ASSIGNOR TO THE WHITEHILL MANUFACTURING COMPANY, OF SAME PLACE.

MOTOR FOR OPERATING SEWING-MACHINES.

SPECIFICATION forming part of Reissued Letters Patent No. 9,949, dated November 29, 1881.

Original No. 70,142, dated October 22, 1867. Application for reissue filed November 4, 1881.

*To all whom it may concern:*

Be it known that I, ROBERT WHITEHILL, Jr., formerly of the city, county, and State of New York, but now of Milwaukee, county of Milwaukee, and State of Wisconsin, have invented a new and useful Improvement in Driving Mechanism for Sewing-Machines, applicable also to other purposes, of which the following is a full, clear, and exact description, reference being had to the accompanying drawings, forming part of this specification, and in which—

Figure 2:
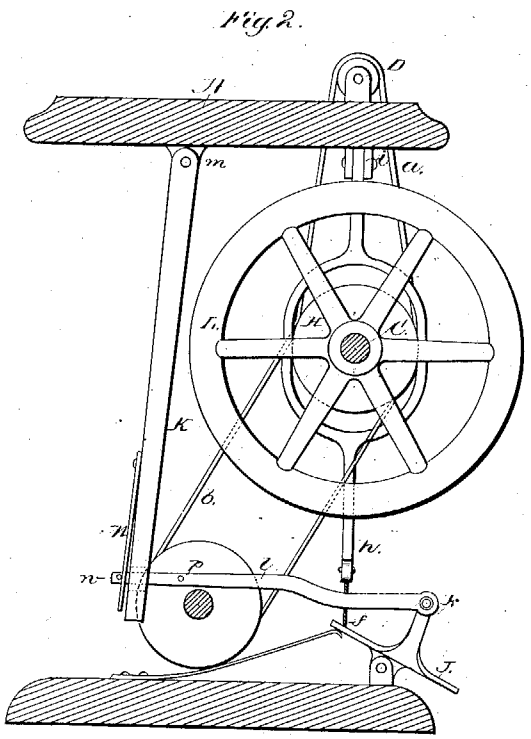
Figure 1:
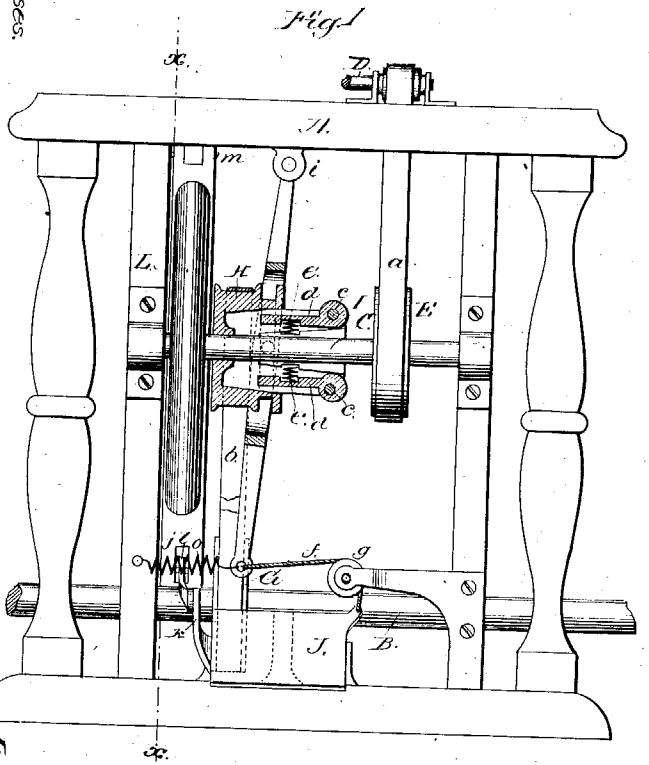

Figure 1 represents a front view of my improved driving mechanism, as it may be applied to the working of a Wheeler & Wilson sewing-machine; and Fig. 2, a vertical section of the same through the line *x x* in Fig. 1.

Similar letters of reference indicate corresponding parts in both figures.

While applicable to driving other than sewing-machines, this my improvement will be best explained in connection with machines of the last-mentioned description.

In working such machines by steam, or other than hand or foot power, it has long been a desideratum not only to throw on or off in a gradual and easy though expeditious manner their connection with the main driving-shaft, but also, while running the latter at a fixed velocity, to either slightly or materially reduce the running speed of the machine, as compared with that of the main driving-shaft. Belt-shifting arrangements and differential pulleys or friction-brakes for accomplishing these ends have each been more or less defective, some of them being too abrupt, slow, or irregular in their action, or working by fits and starts, and failing to let down or get up the speed in a regular or gradual manner.

My invention accomplishes all that is desired in this respect by a combination of a clutch and brake acting in a reverse manner to each other—that is to say, the friction of the clutch diminishing as the pressure of the brake increases, and vice versa, and both being under the same or united control by the hand or foot to increase or diminish the speed of the machine relatively to the main driving-shaft, or to entirely stop the machine; and my invention further consists in a peculiar construction of spring-clutch for such purpose.

Referring to the accompanying drawings, A represents a table or bench, along either side of which, by suitably extending the same, may be arranged a series of sewing-machines operated from a common prime mover or main driving-shaft, B—say through the intervention of a counter-shaft, C, though this latter in some cases may be dispensed with—as will be found hereinafter more fully referred to.

D represents the spindle or shaft from which the needle and other working parts of the sewing-machine derive their motion, and which is driven by a belt, *a*, from a pulley, E, on the counter-shaft C.

On the main driving-shaft B is a pulley, G, which, by belt *b*, communicates motion to a clutch or pulley, H, hung loose on the counter-shaft C, so as to be capable of sliding longitudinally thereon, and made of a circularly tapering or conical configuration internally. Facing the open end of this clutch-pulley, and fast to the counter-shaft C, is a clutch, I, which has a spring or elastic character, and is preferably constructed as follows: Hinged, as at *c*, to the body of the clutch I, at or toward its rear end, are leaves *d*, pressed outward by springs *e*. To operate the counter-shaft C the pulley H is thrown into frictional contact or gear with the clutch I, which may be done by means of a spring-borne or weighted treadle, J, acting through chain or rope *f*, running over a pulley, *g*, and connected with a clutch-lever, *h*, pivoted as at *i*, a spring, *j*, moving the lever *h* back when pressure on the treadle is released.

Connected with the treadle J—say by an arm, *k*, and rod *l*—and acting on a fly or other wheel, L, on the counter-shaft C, is a brake, K, pivoted as at *m*. This brake is of an elastic character, either by making it wholly of a spring or through the intervention of a spring, M, secured at its one end to the brake and controlled at or near its other end to regulate its pressure on the brake by a back pin, *n*, carried by the rod *l*. This rod *l* passes freely through a slot, *o*, in the brake, and is provided with a front cross-pin, *p*, to entirely relieve the brake from action on the wheel M, when desired.

In the operation of the parts as thus constructed, supposing pressure to be released from the treadle J, then the main shaft B will continue to rotate without giving motion to the counter-shaft C, by reason of the pulley H being out of frictional contact with the spring-clutch I, or in only such contact as that, in view of the resistance offered by the spring-brake on the wheel L, the friction between the pulley H and clutch I will be insufficient the one to drive the other; but supposing it be necessary to start the shaft or spindle D, then pressure is gradually applied to the treadle J, which relieves to some extent the force of the brake or pressure of the spring M thereon, and at the same time puts into gradually-increasing frictional contact the pulley H with the spring-clutch I, which latter, by its construction, (at first biting only by or near its forward extremities or front portions of the outer edges of the leaves *d*,) gradually increases its frictional gripe or hold, for as the pulley H slides on the clutch the leaves *d*, by the compression of the springs *e*, approximate the angle of the conical cavity in the pulley H. In this way—that is, by the gradually-increasing bite of the spring-clutch and diminishing resistance to the spring-brake by one and the same action of the treadle—the comparatively rapid motion of the main shaft B is or may be communicated at first in a slow but regular manner without slip or jerk to the counter-shaft C, giving a gradually-increasing velocity to the latter, till, say, the treadle has been so far depressed as to cause the pin *p* to altogether relieve the brake K from action on the wheel L, by which time the pulley H will be thrown into full frictional contact with the spring-clutch I, and the counter-shaft C will be driven with the full velocity due to the relative diameters of the pulleys G and H, or as if the connection of the shafts B and C were a direct one. The same principle of action applies to slackening speed by gradually relieving pressure of the foot from the treadle J till the counter-shaft C moves at the requisite slower velocity, or lies altogether stopped by the combined action of the friction-brake and simultaneous release of the spring-clutch. Such a combination enables the operator of a sewing-machine to rapidly and regularly increase or diminish the running-speed of his machine without slip or jerk, though the driving-shaft travel at a uniform velocity, and to stop the machine with the needle in any desired position.

There being no belt-shifter or belt-regulating friction device necessary to stop or change the velocity of the motion, machines may be arranged on opposite sides or edges of the table, the one set driven by straight and the other by cross belts, inasmuch as the driving-friction is regulated independently of the belts.

It is not absolutely necessary that a counter-shaft, C, should be employed, and in certain classes of sewing-machines such shaft is not used; but in such case the spring-cone I may be made fast on the main driving-shaft, and the clutch H be fitted loose thereon with provision for the application of the spring-brake to it and communicating power by belt direct to the machine.

Of course this my improvement is applicable as a means of conveying power to or controlling the speed of other than sewing-machines.

I claim—

1. The combination, for simultaneous or joint action by one and the same motion or application of force, of a friction clutch and brake as a means of stopping or starting and varying the speed of a secondary shaft relatively to a prime mover traveling at a uniform velocity, substantially as specified.

2. The shaft D and a prime-mover shaft to actuate it by suitable belting, combined with a friction-clutch and a brake acting in a reverse manner to each other, as and for the purpose described.

3. A uniformly-driven shaft, and shaft D, to be driven more or less rapidly by it or to remain at rest, as desired, and belting to move shaft D, and a friction clutch and brake acting in a reverse manner to each other, as described, combined with a treadle adapted to control the engagement or disengagement of the friction-clutch or the application of the brake at different times, substantially as set forth.

4. The spring-clutch I, constructed, essentially as described, of hinged leaves *d*, acted upon by springs *e*, and operating in concert with a conically-recessed pulley, H, as herein set forth.

5. In combination with the treadle J, the brake K, provided with a spring, M, and controlled by stops or projections of, from, or through a connecting-rod or sliding bar, *l*, substantially as shown and described.

ROBERT WHITEHILL, JR.

Witnesses:

FRANK M. HOYT,

A. K. JOSSELYN.